(12) United States Patent
Kim et al.

(10) Patent No.: US 10,025,421 B2
(45) Date of Patent: Jul. 17, 2018

(54) TOUCH WINDOW

(71) Applicant: LG INNOTEK CO., LTD., Seoul (KR)

(72) Inventors: Seung Jin Kim, Seoul (KR); Jong Sun Kim, Seoul (KR); Dong Mug Seong, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 15/126,703

(22) PCT Filed: May 8, 2015

(86) PCT No.: PCT/KR2015/004599
§ 371 (c)(1),
(2) Date: Sep. 16, 2016

(87) PCT Pub. No.: WO2015/174688
PCT Pub. Date: Nov. 19, 2015

(65) Prior Publication Data
US 2017/0090647 A1    Mar. 30, 2017

(30) Foreign Application Priority Data

May 12, 2014  (KR) .................. 10-2014-0056420
May 21, 2014  (KR) .................. 10-2014-0060761

(51) Int. Cl.
*G06F 3/041*    (2006.01)
*G06F 3/044*    (2006.01)

(52) U.S. Cl.
CPC ............ *G06F 3/0416* (2013.01); *G06F 3/044* (2013.01); *G06F 3/0412* (2013.01); *G06F 2203/04101* (2013.01); *G06F 2203/04102* (2013.01); *G06F 2203/04112* (2013.01)

(58) Field of Classification Search
CPC ...... G06F 3/0416; G06F 3/0412; G06F 3/044; G06F 1/1643; H01H 1/06
See application file for complete search history.

(56) References Cited

U.S. PATENT DOCUMENTS

| | | | |
|---|---|---|---|
| 2009/0002337 | A1 | 1/2009 | Chang |
| 2014/0041999 | A1 | 2/2014 | Yim et al. |
| 2014/0049485 | A1 | 2/2014 | Oh et al. |
| 2014/0152910 | A1* | 6/2014 | Kang .................. G06F 1/1643 349/12 |

(Continued)

FOREIGN PATENT DOCUMENTS

| | | |
|---|---|---|
| JP | 2009-009574 | 1/2009 |
| JP | 2014-021522 | 2/2014 |

(Continued)

OTHER PUBLICATIONS

International Search Report and Written Opinion dated Jul. 17, 2015 issued in Application No. PCT/KR2015/004599.

*Primary Examiner* — Kevin M Nguyen
(74) *Attorney, Agent, or Firm* — KED & Associates, LLP (57) ABSTRACT

A touch window according to one embodiment includes a substrate; and a sensing electrode and a wire electrode on one surface of the substrate, wherein the wire electrode is formed in a mesh shape, the wire electrode comprises a second mesh line and a connection mesh line, and the connection mesh line connects at least one of disconnection areas of the mesh shape.

17 Claims, 8 Drawing Sheets

(56) References Cited

U.S. PATENT DOCUMENTS

2014/0218325 A1* 8/2014 Iwami ...................... B32B 7/02
　　　　　　　　　　　　　　　　　　　　　　345/173
2015/0097801 A1* 4/2015 Trend ..................... G06F 3/046
　　　　　　　　　　　　　　　　　　　　　　345/174

FOREIGN PATENT DOCUMENTS

| KR | 10-2012-0074258 | 7/2012 |
| KR | 2012-0072187 | 7/2012 |

* cited by examiner

TOUCH WINDOW

CROSS-REFERENCE TO RELATED PATENT APPLICATIONS

This application is a U.S. National Stage Application under 35 U.S.C. § 371 of PCT Application No. PCT/KR2015/004599, filed May 8, 2015, which claims priority to Korean Patent Application Nos. 10-2014-0056420, filed May 12, 2014, and 10-2014-0060761, filed May 21, 2014, whose entire disclosures are hereby incorporated by reference.

TECHNICAL FIELD

The embodiment relates to a touch window.

BACKGROUND ART

Recently, a touch panel, which performs an input function through the touch of an image displayed on a display device by an input device, such as a stylus pen or a finger, has been applied to various electronic appliances.

The touch window may be typically classified into a resistive touch window and a capacitive touch window. In the resistive touch window, the position of the touch point is detected by detecting the variation of resistance according to the connection between electrodes when pressure is applied to an input device. In the capacitive touch window, the position of the touch point is detected by detecting the variation of capacitance between electrodes when a finger of the user is touched on the capacitive touch window. When taking into consideration the convenience of a fabrication scheme and a sensing power, the capacitive touch window has been spotlighted in a smaller model touch window recently.

The touch window may include a substrate on which a sensing electrode and a wire electrode connected to the sensing electrode are disposed, and the position of the touch point may be detected by detecting the variation of capacitance when the area in which the sensing electrode is disposed is touched.

In this case, the sensing and wire electrodes may be disposed on one surface of a single substrate or each one surface of plural substrates.

When the sensing and wire electrodes are disposed on one surface of a single substrate, the wire electrode may be drawn out in various directions. For example, the wire electrode may extend from an active area to an inactive area.

In this case, when the wire electrodes disposed on the active area include metal, the wire electrodes may be viewed.

Therefore, there is a need to provide a touch window having a new structure which may solve the above-mentioned problems.

DISCLOSURE OF INVENTION

Technical Problem

The embodiment is to provide a touch window having improved visibility and reliability.

Solution to Problem

According to one embodiment, there is provided a touch window which includes a substrate; and a sensing electrode and a wire electrode on one surface of the substrate, wherein the wire electrode is formed in a mesh shape, the wire electrode comprises a second mesh line and a connection mesh line, and the connection mesh line connects at least one of disconnection areas of the mesh shape.

Advantageous Effects of Invention

According to the touch window of the first embodiment, an area disconnected in the mesh shape of the wire electrode pattern may be connected by the connection mesh line. In detail, a shorter area of the disconnection areas may be connected by the connection mesh line.

Thus, the wire electrode may be prevented from being open-circuited due to the disconnection of the mesh shape in the wire electrode.

In addition, since the shorter area of the disconnection areas in the wire electrode pattern is connected by the connection mesh line so that the disconnection area is connected while maintaining the uniformity with other mesh shapes, the electrodes may be prevented from being viewed from an outside due to the break of the mesh uniformity.

In addition, since the disconnection area is connected by the connection mesh line without increasing the entire width of the wire electrode, a dead zone may be reduced by increasing the width of the wire electrode on the inactive area.

Thus, the touch window according to the first embodiment may have substantially improved reliability and visibility.

In addition, the touch window according to the second embodiment may include a plurality of sub wire electrodes extending in a first direction and a plurality of sub wire electrodes extending in a second direction.

Thus, the touch window according to the second embodiment may prevent a moire phenomenon, which may occur when the wire electrode extending on the active area toward the inactive area overlaps display pixels, from occurring.

That is, according to the wire electrode of the second embodiment, in order to prevent the moire phenomenon, the sub wire electrodes, which extend in the second direction, that is, a direction diagonally crossing the first direction, are disposed at an arbitrary interval and angle on the sub wire electrodes extending in the first direction, so that the moire phenomenon may be prevented from occurring in the wire electrode.

Thus, the touch window according to the second embodiment may have substantially improved reliability and visibility.

MODE FOR THE INVENTION

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

In the following description, when a part is connected to the other part, the parts are not only directly connected to each other, but also indirectly connected to each other while interposing another part therebetween. In addition, when a predetermined part "includes" a predetermined component, the predetermined part does not exclude other components, but may further include other components unless otherwise indicated.

The thickness and size of each layer (film), region, pattern, or structure shown in the drawings may be exaggerated, omitted or schematically drawn for the purpose of convenience or clarity. In addition, the size of each layer (film), region, pattern, or structure does not utterly reflect an actual size.

Referring to FIGS. 1 to 7, a touch window according to the first embodiment may include a substrate 200, a sensing electrode 300, a wire electrode 400 and a printed circuit board 500.

The substrate 200 may be rigid or flexible. For example, the substrate 200 may include glass substrate or plastic. In detail, the substrate 200 may include chemically tempered/semi-tempered glass, such as soda lime glass or alumino-silicate glass, reinforced/flexible plastic, such as polyimide (PI), polyethylene terephthalate (PET), propylene glycol (PPG), or poly carbonate (PC), or sapphire.

In addition, the substrate 200 may include an optically isotropic film. For example, the substrate 200 may include cyclic olefin copolymer (COC), cyclic olefin polymer (COP), optically isotropic polycarbonate (PC), or optically isotropic polymethyl methacrylate (PMMA).

The sapphire has superior electric characteristics, such as permittivity, so that a touch response speed may be greatly increased and a space touch such as hovering may be easily implemented. In addition, since the sapphire has high surface hardness, the sapphire is applicable to a cover substrate. The hovering refers to a technique of recognizing coordinates even at a slight distance from a display.

In addition, the substrate 200 may be bent to have a partial curved surface. That is, the substrate 200 may be bent to have a partial flat surface and a partial curved surface. In detail, an end of the substrate 200 may be bent to have a curved surface or may be bent or flexed to have a surface including a random curvature.

In addition, the substrate 200 may include a flexible substrate having a flexible property.

In addition, the substrate 200 may include a curved or bended substrate. That is, a touch window including the substrate 200 may be formed to have a flexible, curved or bended property. For this reason, the touch window according to the embodiment may be easily portable and may be variously changed in design.

The substrate 200 may include a cover substrate. In addition, an additional cover substrate may be further disposed on the substrate 200. In this case, the substrate and the cover substrate may adhere to each other through an adhesive layer.

The substrate 200 may have an active area AA and an inactive area UA defined therein.

An image may be displayed in the active area AA. The image is not displayed in the inactive area UA provided at a peripheral portion of the active area AA.

In addition, the position of an input device (e.g., finger) may be sensed in at least one of the active area AA and the inactive area UA. If the input device, such as a finger, touches the touch window, the variation of capacitance occurs in the touched part by the input device, and the touched part subject to the variation of the capacitance may be detected as a touch point.

The sensing electrode 300 may be provided on the cover substrate 200 or the substrate 200. In detail, the sensing electrode 300 may be disposed on at least one of the active area AA and the inactive area UA. Preferably, the sensing electrode 300 may be disposed on the active area AA.

The sensing electrode 300 may include first and second sensing electrodes 310 and 320.

The first and second sensing electrodes 310 and 320 may be disposed on one surface of the substrate 200. In detail, the first and second electrodes 310 320 may be disposed on the same surface of the substrate 200. The first and second electrodes 310 and 320 may be disposed on the same surface of the substrate 200 while being spaced apart from each other, such that the first and second electrodes 310 and 320 may not make contact with each other.

The sensing electrode 300 may include a transparent conductive material that allows electricity to flow therethrough without interrupting transmission of light. For example, the sensing electrode 300 may include metal oxide such as indium tin oxide (ITO), indium zinc oxide (IZO), copper oxide, tin oxide, zinc oxide, or titanium oxide.

In addition, the sensing electrode 300 may include a nanowire, a photo sensitive nanowire film, a carbon nanotube (CNT), graphene, conductive polymer or the mixture thereof.

When a nano-composite such as a nanowire or a carbon nanotube (CNT) is used, the sensing electrode 300 may have a black color and there is a merit capable of controlling the color and reflectance while securing electric conductivity through the content control of nano-powder.

In addition, the sensing electrode 300 may include various metals. For example, the sensing electrode 300 may include at least one of Cr, Ni, Cu, Al, Ag, Mo, Au, Ti and the alloy thereof.

The sensing electrode 300 may include a mesh shape. In detail, the sensing electrode 300 may include a plurality of sub-electrode, and the sub-electrode may include first mesh electrodes crossing each other in a mesh shape.

Figure 6:
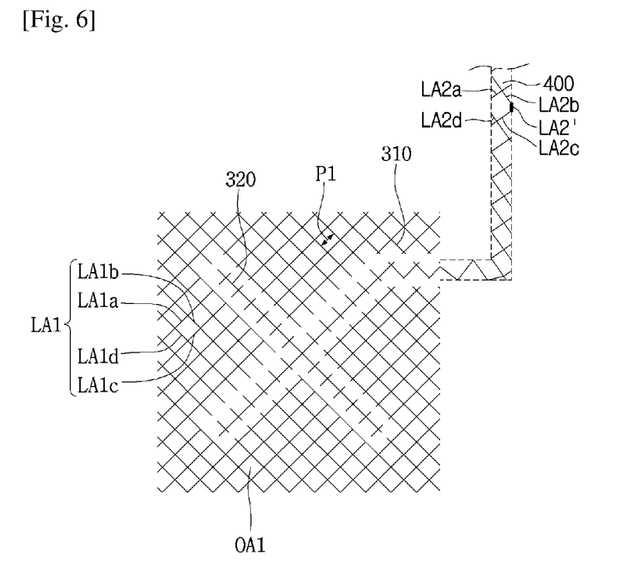
Figure 7:
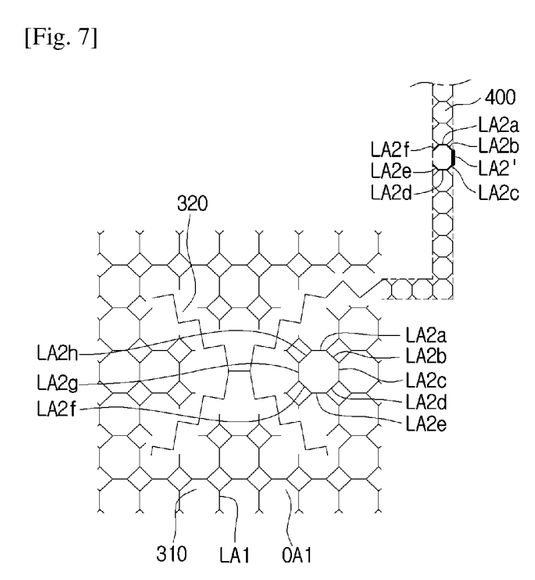

In detail, referring to FIG. 6 or 7, the sensing electrode 300 may include a first mesh line LA1 formed by a plurality of sub-electrodes crossing each other in a mesh shape, and a first mesh opening part OA1 formed by the first mesh line LA1a. In this case, a line width of the first mesh line LA1 may be in the range of about 0.1 μm to about 10 μm. The first mesh line LA1 having a line width less than about 0.1 μm may not be implemented through the fabrication process. When the line width of the first mesh line LA1 exceeds about 10 µm, the sensing electrode pattern may be viewed from an outside so that the visibility may be degraded. Preferably, the first mesh line LA1 may have a line width in the range of about 1 µm to about 3.5 µm.

The first mesh opening part OA1 may be formed in various shapes. For example, the first mesh opening part OA1 may have various shapes such as a polygonal shape including a rectangular shape, a diamond shape, a pentagon shape or a hexagonal shape, or a circular shape. In addition, the first mesh opening part OA1 may have a regular shape or a random shape.

As the sensing electrode has a mesh shape, the pattern of the sensing electrode may not be viewed in the active area AA or the inactive area UA. In other words, even when the sensing electrode is formed of metal, the pattern may not be viewed. In addition, even when the sensing electrode is applied to a large-size touch window, the resistance of the touch window may be reduced.

The wire electrode 400 may be disposed on the substrate 200. In detail, the wire electrode 400 and the sensing electrode 300 may be disposed on the same surface.

Figure 1:
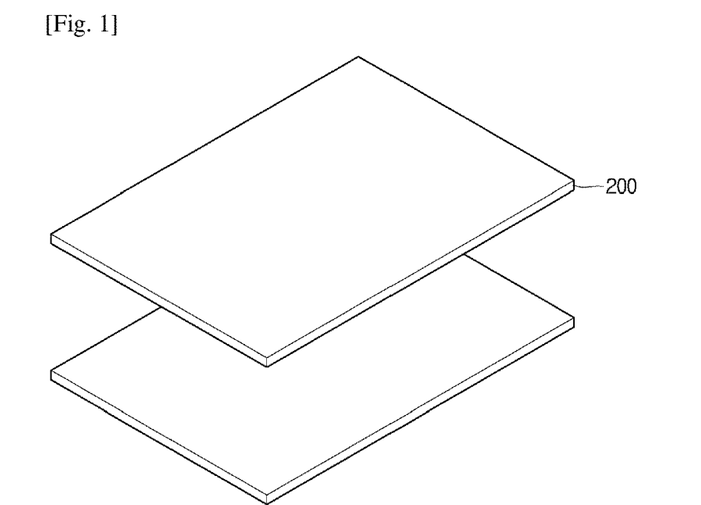
FIG. 1 is a brief perspective view showing a touch window according to an embodiment.
Figure 2:
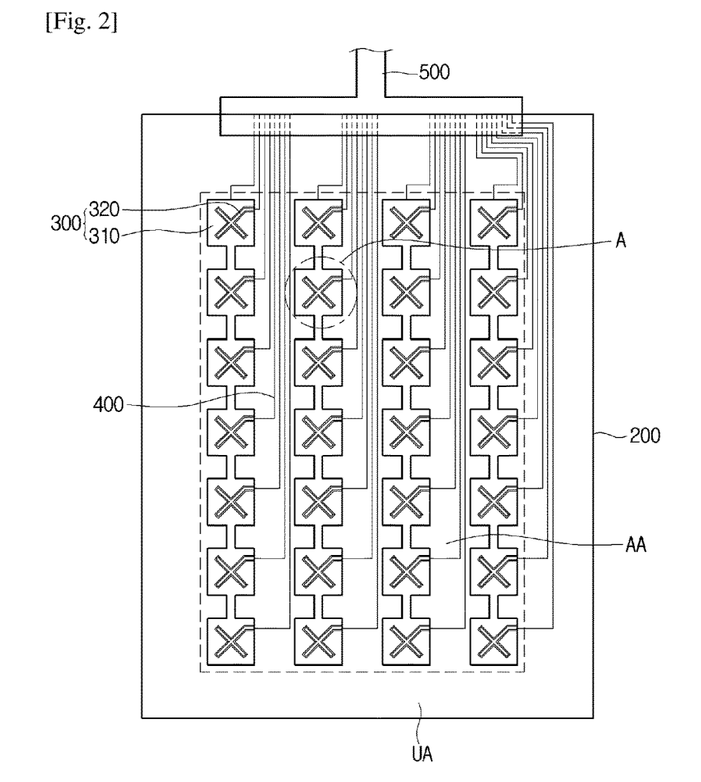
FIG. 2 is a top view of a touch window according to an embodiment.

Referring to FIG. 2, the wire electrode 400 may extend from the inactive area UA toward the active area AA. In detail, the wire electrode 400 may be connected to the sensing electrode 300 in the active area AA and may extend from the active area AA toward the inactive area UA.

The wire electrode 400 may extend toward the inactive area UA and may be connected to the printed circuit board 500 in the inactive area UA.

The wire electrode 400 may include a material equal or similar to the sensing electrode 400 described above. In detail, the wire electrode 400 may include metal oxide such as indium tin oxide (ITO), indium zinc oxide (IZO), copper oxide, tin oxide, zinc oxide or titanium oxide, a nanowire, a photo sensitive nanowire film, a carbon nanotube (CNT), graphene, conductive polymer, Cr, Ni, Cu, Au, Ti, Al, Ag, Mo, or the alloy thereof.

The wire electrode 400 may include a mesh shape. In detail, the wire electrode 400 may include a plurality of sub-electrodes and the sub-electrode may include second mesh electrodes crossing each other in a mesh shape.

Figure 3:
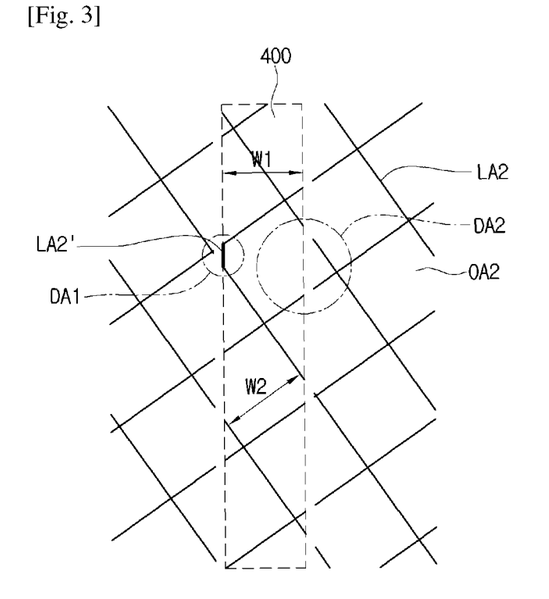
FIG. 3 is an enlarged view of a wire electrode of a touch window according to a first embodiment.

Referring to FIG. 3, the wire electrode may include a second mesh line LA2 and a mesh opening part OA2 may be formed by the second mesh line LA2. The second mesh opening part OA2 may be formed in various shapes. For example, the second mesh opening part OA2 may have various shapes such as a polygonal shape including a rectangular shape, a diamond shape, a pentagon shape or a hexagonal shape, or a circular shape. In addition, the second mesh opening part OA2 may have a regular shape or a random shape.

A width W1 of the wire electrode 400 may be different from a width W2 of the second mesh opening part OA2. In detail, a width W2 of the second may be wider than the width W1 of the wire electrode 400. That is, a pitch of the second mesh line LA2 may be greater than the width W1 of the wire electrode 400.

The wire electrode 400 may include a connection mesh line LA2. In detail, the wire electrode 400 may include the second mesh line LA2 and the connection mesh line LA2'.

The connection mesh line LA2' may connect a line disconnection area of the mesh electrode. In detail, the wire electrode 400 may be formed in a various mesh shape described above by a plurality of second mesh lines LA2 and the second mesh lines LA2 may be connected to each other. In this case, when a pattern of the wire electrode 400 is formed, line disconnection areas, in which the second mesh line LA2 is partially disconnected, may be generated in the wire electrode pattern and the connection mesh line LA2' may be disposed in at least one of the line disconnection areas.

That is, since the width W1 of the wire electrode 400 is different from the width W2 of the second mesh opening part OA2, an area, in which the second mesh line LA2 is partially cut off, may occur inside the pattern of the wire electrode 400.

The connection mesh line LA2' is disposed in the areas in which the second mesh lines LA2 are disconnected from each other, so that the connection mesh line LA2' may allow the second mesh lines LA2 to be electrically connected to each other.

The connection mesh line LA2' may connect a short area of the disconnection areas. In detail, the disconnection areas may include first and second disconnection areas and the connection mesh line LA2' may connect a shorter disconnection area of the first and second disconnection areas.

A length of the connection mesh line LA2' may be different from that of the second mesh line LA2. In detail, the length of the connection mesh line LA2' may be longer or shorter than that of the second mesh line LA2.

Figure 4:
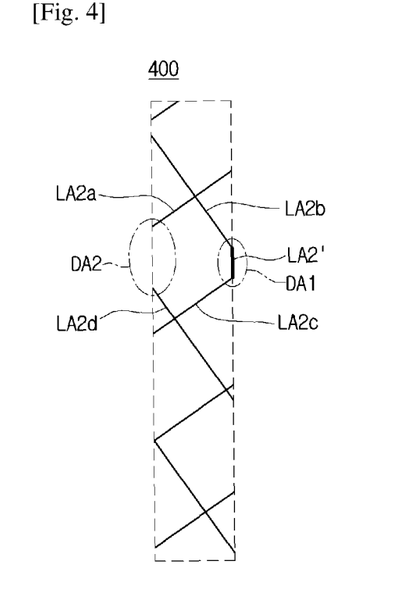
FIGS. 4 to 7 are enlarged views of a wire electrode of a modified touch window according to the first embodiment.

In addition, referring to FIG. 4, the length of the connection mesh line LA2' may be different from that of the first mesh line LA1. In detail, the length of the connection mesh line LA2' may be longer or shorter than that of the first mesh line LA1.

That is, the length of the connection mesh line LA2' may be longer than those of the first mesh line LA1 of the sensing electrode 300 and the second mesh line LA2 of the wire electrode 400.

Referring to FIGS. 4 to 7, the sensing electrode 300 and the wire electrode 400 may include a plurality of sub-mesh lines.

Referring to FIG. 4, the wire electrode 400 may include first to fourth sub second mesh lines LA2a to LA2d and a connection mesh line LA2'. That is, the wire electrode 400 may be formed in a rectangular mesh shape while being partially disconnected.

In detail, the first sub second mesh line LA2a may be connected to the second sub second mesh line LA2b. The second sub second mesh line LA2b may be disconnected from the third sub second mesh line LA2c. The third sub second mesh line LA2c may be connected to the fourth sub second mesh line LA2d. The fourth sub second mesh line LA2d may be disconnected from the first sub second mesh line LA2a. That is, the wire electrode 400 may include a first disconnection area DA1 formed between the second sub second mesh line and the third sub second mesh line and a second disconnection area DA2 formed between the fourth sub second mesh line and the first sub second mesh line.

The connection mesh line LA2' may be connected to at least one of the first and second disconnection areas DA1 and DA2. In detail, the connection mesh line LA2' may be connected to a shorter area of the first and second disconnection areas DA1 and DA2.

In addition, the connection mesh line may extend in the same direction as the wire.

A length of the connection mesh line LA2' may be different from at least one of the lengths of the first to fourth sub second mesh lines LA2a to LA2d. In detail, the length of the connection mesh line may be longer or shorter than at least one of the lengths of the first to fourth sub second mesh lines LA2a to LA2d.

Figure 5:
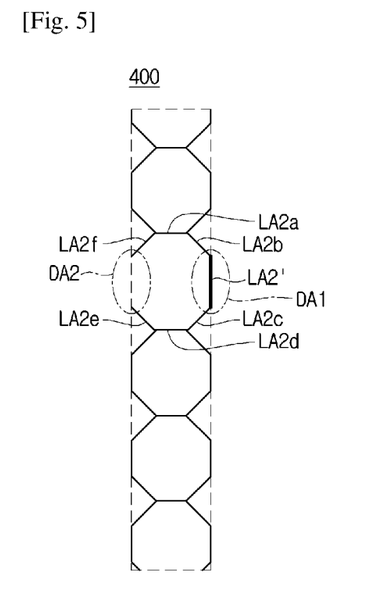

Referring to FIG. 5, a touch window according to another embodiment may include first to sixth sub second mesh lines LA2a to LA2f and a connection mesh line LA2'. That is, the wire electrode 400 may be formed in an octagonal mesh shape while being partially disconnected.

In detail, the first sub second mesh line LA2a may be connected to the second sub second mesh line LA2b. The second sub second mesh line LA2b may be disconnected from the third sub second mesh line LA2c. The third sub second mesh line LA2c may be connected to the fourth sub second mesh line LA2d. The fourth sub second mesh line LA2d may be connected to the fifth sub second mesh line LA2e. The fifth sub second mesh line LA2e may be disconnected from the sixth sub second mesh line LA2f. The sixth sub second mesh line LA2f may be connected to the first sub second mesh line LA2a. That is, the wire electrode 400 may include a first disconnection area DA1 formed between the second sub second mesh line and the third sub second mesh line and a second disconnection area DA2 formed between the fourth sub second mesh line and the first sub second mesh line.

That is, the wire electrode 400 may include a first disconnection area DA1 formed between the second sub second mesh line and the third sub second mesh line and a second disconnection area DA2 formed between the fifth sub second mesh line and the sixth sub second mesh line. In detail, one part of the mesh line formed in the mesh shape by the wire electrode pattern is disconnected from the other parts of the mesh line so that the disconnection areas may be formed.

The connection mesh line LA2' may be connected to at least one of the first and second disconnection areas DA1 and DA2. In detail, the connection mesh line LA2' may connect a shorter disconnection area of the first and second disconnection areas.

In addition, the connection mesh line may extend in the same direction as the wire.

In addition, the length of the connection mesh line LA2' may be longer than those of other mesh lines separated from each other by the wire pattern. In addition, the length of the connection mesh line LA2' may be different from at least one of the lengths of the first to sixth sub second mesh lines LA2a to LA2f. In detail, the length of the connection mesh line may be longer than at least one of the lengths of the first to fourth sub second mesh lines.

Referring to FIG. 6, the sensing electrode 300 may include first to fourth sub first mesh lines LA1a to LA1d. That is, the sensing electrode 300 may be substantially formed in a rectangular mesh shape.

The first sub first mesh line LA1a may be connected to the second sub first mesh line LA1b. The second sub first mesh line LA1b may be connected to the third sub first mesh line LA2c. The third sub first mesh line LA1c may be connected to the fourth sub first mesh line LA1d. The fourth sub first mesh line LA1d may be connected to the first sub first mesh line LA1a.

The length of the connection mesh line LA2' may be different from at least one of the lengths of the first to fourth sub first mesh lines LA1a to LA1d. In detail, the length of the connection mesh line may be longer or shorter than at least one of the lengths of the first to fourth sub first mesh lines LA1a to LA1d.

Referring to FIG. 7, the sensing electrode 300 may include first to eighth sub first mesh lines LA1a to LA1h. That is, the sensing electrode 300 may be substantially formed in an octagonal mesh shape.

The first sub first mesh line LA1a may be connected to the second sub first mesh line LA1b. The second sub first mesh line LA1b may be connected to the third sub first mesh line LA1c. The third sub first mesh line LA1c may be connected to the fourth sub first mesh line LA1d. The fourth sub first mesh line LA1d may be connected to the first sub first mesh line LA1a. The fifth sub first mesh line LA1e may be connected to the sixth sub first mesh line LA1f. The sixth sub first mesh line LA1f may be connected to the seventh sub first mesh line LA1g. The seventh sub first mesh line LA1g may be connected to the eighth sub first mesh line LA1h. The eighth sub first mesh line LA1h may be connected to the first sub first mesh line LA1a.

A length of the connection mesh line LA2' may be different from at least one of the lengths of the first to eighth sub first mesh lines LA1a to LA1h. In detail, the length of the connection mesh line may be longer than at least one of the lengths of the first to eighth sub first mesh lines.

According to the touch window of the first embodiment, an area disconnected in the mesh shape of the wire electrode pattern may be connected by the connection mesh line. In detail, a shorter area of the disconnection areas may be connected by the connection mesh line.

Thus, the wire electrode may be prevented from being open-circuited due to the disconnection of the mesh shape in the wire electrode.

In addition, since the shorter area of the disconnection areas in the wire electrode pattern is connected by the connection mesh line so that the disconnection area is connected while maintaining the uniformity with other mesh shapes, the electrodes may be prevented from being viewed from an outside due to the break of the mesh uniformity.

In addition, since the disconnection area is connected by the connection mesh line without increasing the entire width of the wire electrode, a dead zone may be reduced by increasing the width of the wire electrode on the inactive area.

Thus, the touch window according to the first embodiment may have substantially improved reliability and visibility.

Hereinafter, a touch window according to the second embodiment will be described with reference to FIG. 8. In the following description of the touch window according to the second embodiment, the description about the parts similar or identical to those of the first embodiment previously described will be omitted. That is, the description about the touch window according to the second embodiment essentially cooperates with that about the touch window according to the first embodiment previously described.

Figure 8:
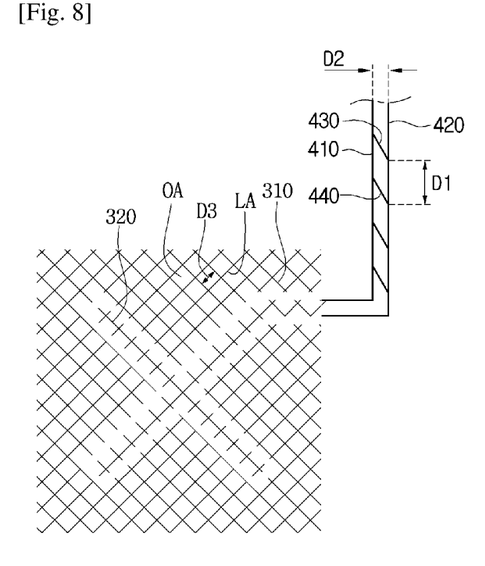
FIG. 8, which is an enlarged view of part A of FIG. 2, is an enlarged view of a wire electrode of a touch window according to a second embodiment.

Referring to FIG. 8, the touch window according to the second embodiment may include first and second sensing electrodes 310 and 320 including a mesh shape and a wire electrode. The wire electrode 400 may include a plurality of sub wire electrodes. In detail, the wire electrode 400 may include a plurality of sub wire electrodes extending in a first direction and a plurality of other sub wire electrodes extending in a second direction different from the first direction.

For example, the wire electrode 400 may include first and second sub wire electrodes 410 and 420 extending in the first direction and third and fourth wire electrodes 430 and 440 extending in the second direction.

That is, the first and second sub wire electrodes 410 and 420 may extend in the same direction and the third and fourth wire electrodes 430 and 440 may extend in a direction different from the extending direction of the first and second sub wire electrodes 410 and 420.

At least one of the first and second sub wire electrodes 410 and 420 may cross at least one of the third and fourth sub wire electrodes 430 and 440. In detail, the first to fourth sub wire electrodes 410 to 440 may cross each other to be disposed in a mesh shape. Thus, the wire electrode 400 may be substantially formed in a mesh shape by the first to fourth sub wire electrodes 410 to 440 which extend while crossing each other.

At least one of the third and fourth sub wire electrodes 430 and 440 may extend in a direction corresponding to at least one of the mesh lines of the sensing electrode. In detail, the third and fourth wire electrodes 430 and 440 may extend in the same direction as at least one of the mesh lines of the sensing electrode.

At least one of the third and fourth sub wire electrodes 430 and 440 may cross at least one of the first and second sub wire electrodes 410 and 420, so that a cross angle in a constant range may be formed therebetween.

In detail, the third and fourth sub wire electrodes 430 and 440 may extend while being inclined at a constant angle with respect to at least one of the first and second sub wire electrodes 410 and 420.

In addition, the third and fourth sub wire electrode 430 and 440 may extend in the same direction as at least one of the mesh lines of the sensing electrode.

In addition, the widths of the third and fourth sub wire electrode 430 and 440 may be substantially equal to that of at least one of the mesh lines of the sensing electrode.

In addition, the cross angle formed at crossings of the first and second sub wire electrodes 410 and 430 and the third and fourth sub wire electrode 430 and 440 may be substantially equal to the inclined angle of at least one of the first and second sub wire electrodes 410 and 420 and the mesh lines of the sensing electrode.

That is, the cross angle formed between the first and second sub wire electrodes 410 and 430 and the third and fourth sub wire electrode 430 and 440 crossing each other may be equal to an angle capable of preventing a moire phenomenon, which may occur when the wire electrode overlaps the pixels of a display, from occurring.

That is, the inclined angle between the mesh lines of the sensing electrode, which extends in a direction corresponding to the extending direction of the third and fourth sub wire electrodes 430 and 440, and the first and second sub wire electrodes 410 and 420 may be substantially equal to, that is, correspond to the cross angle between the first and second sub wire electrodes 410 and 420 and the third and fourth sub wire electrodes 430 and 440 which cross each other.

Although FIG. 8 shows the wire electrode 400 including two sub wire electrodes extending in the first direction and two sub wire electrodes extending in the second direction, the embodiment is not limited thereto and the sub wire electrodes may include more many sub wire electrodes.

The third and fourth sub wire electrodes 430 and 440 may be spaced apart from each other. In detail, the third and fourth sub wire electrodes 430 and 440 may be spaced apart from each other by a first spaced distance D1.

The first and second sub wire electrodes 410 and 420 may be spaced apart from each other. In detail, the first and second sub wire electrodes 410 and 420 may be spaced apart from each other by a second spaced distance D2.

In addition, the mesh lines LA of the sensing electrode may be spaced apart from each other. In detail, the mesh opening part OA may allow the mesh lines LA having a polygonal or circular shape to be spaced apart from each other by the width of the mesh opening part OA. That is, the mesh lines of the sensing electrode may be spaced apart from each other by a third spaced distance D3.

The first to third spaced distances D1 to D3 may be equal to or different from each other. In detail, the first spaced distance D1 may be greater than the second spaced distance D2. In addition, the third spaced distance D3 may be greater than the second spaced distance D2. Further, the first spaced distance D1 may be substantially equal to or correspond to the third spaced distance D3.

The touch window according to the second embodiment may include a plurality of sub wire electrodes extending in a first direction and a plurality of sub wire electrodes extending in a second direction.

Thus, the touch window according to the second embodiment may prevent a moire phenomenon, which may occur when the wire electrode extending on the active area toward the inactive area overlaps display pixels, from occurring.

That is, according to the wire electrode of the second embodiment, in order to prevent the moire phenomenon, the sub wire electrodes, which extend in the second direction, that is, a direction diagonally crossing the first direction, are disposed at an arbitrary interval and angle on the sub wire electrodes extending in the first direction, so that the moire phenomenon may be prevented from occurring in the wire electrode.

Thus, the touch window according to the second embodiment may have substantially improved reliability and visibility.

Figure 9:
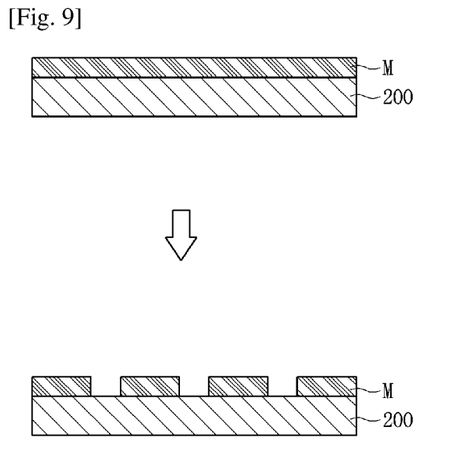
FIGS. 9 to 11 are views illustrating a process of forming a sensing electrode having a mesh shape and/or a wire electrode of a touch window according to an embodiment.
Figure 10:
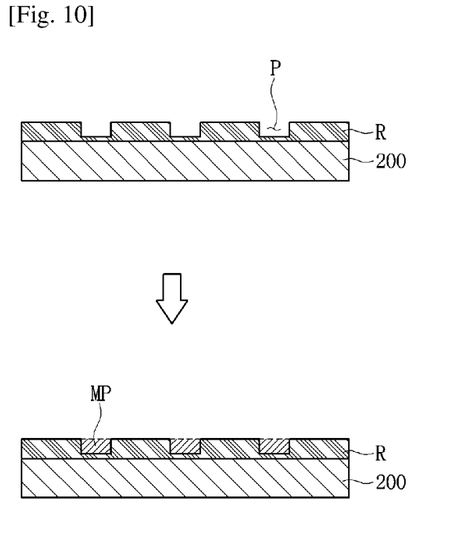
Figure 11:
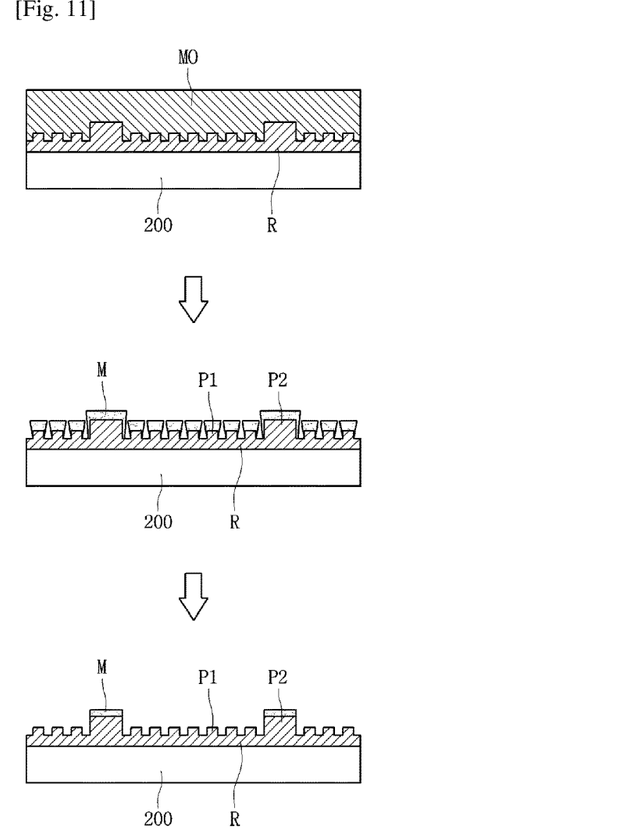

FIGS. 9 to 11 are views illustrating a process of forming a sensing electrode having a mesh shape and/or a wire electrode of a touch window according to an embodiment.

Referring to FIG. 21, after an electrode layer 200 including metal is provided on an entire surface of a substrate 100, the electrode layer 200 is etched in a mesh shape such that a sensing electrode and/or a wire electrode having a mesh-shape may be formed. For example, after a metal such as Cu is deposited on the entire surface of the substrate 100 including polyethylene terephthalate to form a Cu layer, a convex Cu mesh electrode having a mesh shape may be formed by etching the Cu layer.

In addition, referring to FIG. 10, after a resin layer R including UV or thermosetting resin is disposed on the substrate 200 and a concave pattern P having a mesh shape is formed on the resin layer R, the concave pattern may be filled with metallic paste MP. In this case, the concave pattern of the resin layer may be formed by imprinting the resin layer with a mold having a convex pattern.

The metallic paste 340 may include at least one of Cr, Ni, Cu, Al, Ag, Mo and the alloy thereof. When the metallic paste is filled into the concave pattern P having the mesh shape and then, is hardened, so that the convex metal mesh electrode may be formed.

In addition, referring to FIG. 23, according to the sensing electrode and/or the wire electrode of the embodiment, after the base substrate 300 including UV resin or thermosetting resin is formed on the substrate 100, a convex nano-pattern and a micro-pattern having a mesh shape are formed on the base substrate 300, and then an electrode layer 200 including at least one of Cr, Ni, Cu, Al, Ag, Mo and the alloy thereof may be formed on the base substrate 300 through a sputtering scheme.

In this case, the convex pattern of the nano-pattern and micro-pattern may be formed by imprinting the base substrate with a mold having a corresponding concave pattern.

Then, the electrode layer M formed on the nano-pattern P1 and micro-pattern P1 is etched to remove only the electrode layer on the nano-pattern and allow the electrode layer on the micro-pattern to remain, so that the metal electrode having a mesh shape may be formed.

In this case, when the metal layer is etched, a difference between the etching rates may occur due to a difference between the junction area of the nano-pattern 211 and the metal layer and the junction area of the micro-pattern 212 and the metal layer. That is, since the junction area of the micro-pattern 212 and the metal layer is larger than the junction area of the nano-pattern 211 and the metal layer, the electrode material on the micro-pattern is less etched, so that the metal layer M on the micro-pattern remains and the metal layer on the nano-pattern 211 is removed by the same etching rate. Thus, the metal electrode having a convex mesh shape corresponding to the micro-pattern 212 may be formed on the substrate 200.

The sensing and/or wire electrode of the touch window according to the embodiment may be formed with a mesh-shaped electrode including a metal layer as shown in FIGS. 9 to 11.

Hereinafter, a touch device, in which the touch window described above is coupled to a display panel, will be described with reference to FIG. 12.

Figure 12:
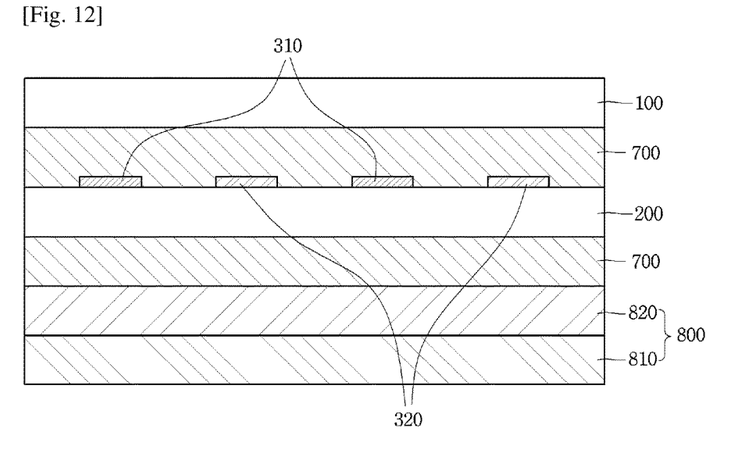
FIG. 12 is a view showing a touch device formed by coupling a touch window and a display panel to each other according to an embodiment.

Referring to FIG. 12, the touch device according to the embodiment may include a display panel 800 and a touch window disposed on the display panel. For example, the display panel may adhere to the touch window through an adhesive layer 700 including optically clear adhesive (OCA).

Figure 15:
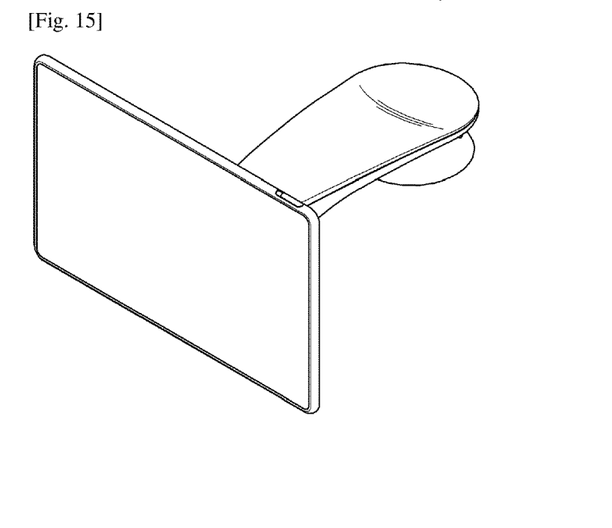

For example, although the touch window, which includes the cover substrate 200 and the substrate 200 adhering to each other through the adhesive layer 700 and the first and second sensing electrodes 310 and 320 spaced apart from each other on the substrate 200, and the display panel 800 are shown in FIG. 15, the embodiment is not limited thereto and the cover substrate 200 may be omitted.

When the display panel 800 is a liquid crystal display panel, the display panel 700 may be formed in a structure in which the first substrate 810 including thin film transistors and pixel electrodes and the second substrate 820 including color filter layers are combined with each other while interposing a liquid crystal layer therebetween.

In addition, the display panel 800 may be a liquid crystal display panel having a COT (color filter on transistor) structure in which the second substrate 820 is combined with the first substrate 810 on which a thin film transistor, a color filter and a black matrix are formed while a liquid crystal layer is interposed between the first and second substrates 810 and 820. That is, the thin film transistor is formed on the first substrate 810, the protective layer is formed on the thin film transistor, and the color filter layer is formed on the protective layer. In addition, the pixel electrode making contact with the thin film transistor is formed on the first substrate 810. In this case, in order to improve an aperture rate and simplify a mask process, the black matrix may be omitted and a common electrode may be formed to serve as the black matrix.

In addition, when the display panel 800 is a liquid crystal panel, the display device may further include a backlight unit for providing light at the back of the display panel 800.

When the display panel 800 is an organic light emitting device, the display panel 800 includes a self light-emitting device which does not require any additional light source. A thin film transistor is formed on the first substrate 810 of the display panel 800, and an organic light-emitting device (OLED) making contact with the thin film transistor may be formed. The OLED may include an anode, a cathode and an organic light-emitting layer formed between the anode and the cathode. In addition, the display panel 800 may further include the second substrate 820, which performs the function of an encapsulation substrate for encapsulation, on the OLED.

Hereinafter, one example of a display device to which a touch window including a fingerprint sensor is applied according to the embodiment described above, will be described with reference to FIGS. 13 to 16.

Figure 13:
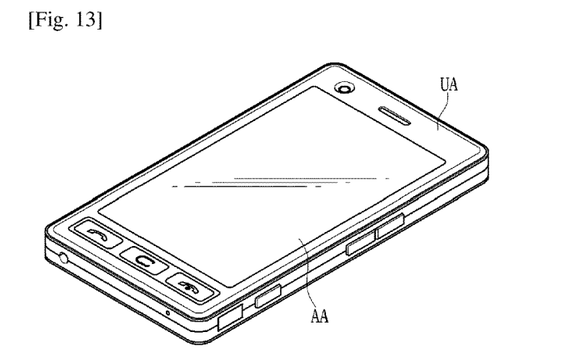
FIGS. 13 to 16 are views showing a touch device to which a touch device according to an embodiment is applied.

Referring to FIG. 13, there is shown a mobile terminal as one example of the touch device. The mobile terminal may include an active area AA and an inactive area UA. The active area may sense a touch signal when a finger touches the active area AA, and an instruction icon pattern part and a logo may be formed in the inactive area UA.

Figure 14:
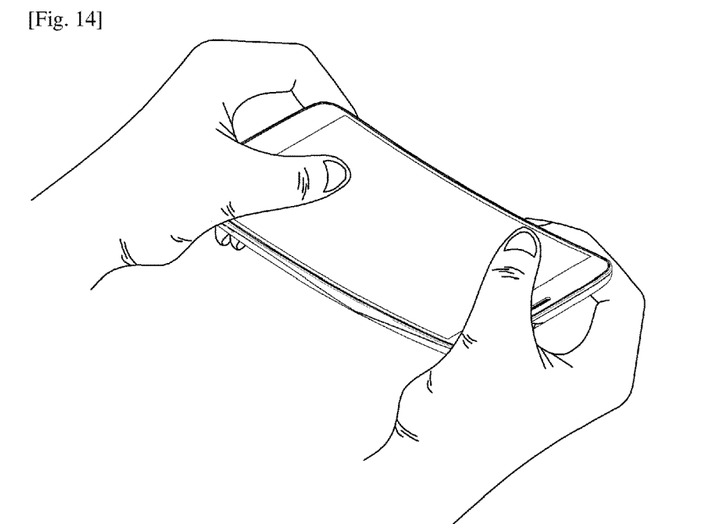

Referring to FIG. 14, the touch window may include a flexible touch window. Thus, a touch device including the flexible touch window may be a flexible touch device. Therefore, a user may bend or curve the flexible touch device with the hand of the user.

Referring to FIG. 15, the touch window may be applied to a vehicle navigation system as well as a display device such as a mobile terminal.

Figure 16:
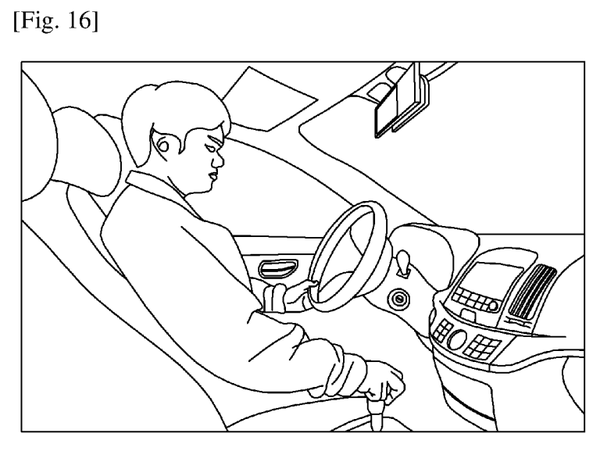

In addition, referring to FIG. 16, the touch window may be applied to a vehicle. That is, the touch window may be applied to various parts in a vehicle to which a touch window is applicable. Accordingly, the touch window is applied to a dashboard as well as a PND (Personal Navigation Display) so that a CID (Center Information Display) may be implemented. However, the embodiment is not limited to the embodiment. In other words, the display may be used in various electronic products.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A touch window comprising:
a substrate including an active area and an inactive area; and
a plurality of sensing electrodes and a plurality of wire electrodes on one surface of the substrate,
wherein a first mesh line and a second mesh line are provided on the active area,
wherein the sensing electrodes are formed by the first mesh line,
wherein the wire electrodes are formed by the second mesh line,
wherein the wire electrodes are defined by a plurality of wire patterns formed from disconnected portions of the second mesh line,
wherein each of the wire patterns includes first to fourth sub second mesh lines and a connection mesh line, wherein each of the wire patterns includes a first disconnection area between the second sub second mesh line and the third sub second mesh line,
wherein each of the wire patterns includes a second disconnection area between the first sub second mesh line and the fourth sub second mesh line, and
wherein the connection mesh line extends through the first disconnection area to connect the second sub second mesh line and the third sub second mesh line, or extends through the second disconnection area to connect the first sub second mesh line and the fourth sub second mesh line.

2. The touch window of claim 1, wherein lengths of the first to fourth sub second mesh lines are different from a length of the connection mesh line.

3. The touch window of claim 2, wherein a length of the connection mesh line is longer than the lengths of the first to fourth sub second mesh lines.

4. The touch window of claim 1, wherein a second mesh opening part formed by the second mesh line, and
a width of the second mesh opening part is different from a width of one of the wire patterns.

5. The touch window of claim 4, wherein the width of the second mesh opening part is wider than the width of the one of the wire patterns.

6. The touch window of claim 1, wherein the sensing electrodes includes first electrodes and second electrodes that are separated from each other on the one surface of the substrate.

7. The touch window of claim 1, wherein the wire electrode extends from the active area toward the inactive area.

8. The touch window of claim 1, wherein the sensing electrodes includes a mesh shape, and
wherein a length of the first mesh line is different from a length of the connection mesh line.

9. The touch window of claim 8, wherein the length of the connection mesh line is shorter than the length of the first mesh line.

10. A touch device comprising:
a touch window according to claim 1; and
a display panel connected on the touch window,
wherein the touch window includes a curved touch window or a flexible touch window.

11. The touch window of claim 1, a length of the first disconnection area is different from a length of the second disconnection area.

12. The touch window of claim 11, wherein the connection mesh line extends through one of the first and second disconnection areas having a shorter length.

13. A touch window comprising:
a substrate; and
a sensing electrode and a wire electrode disposed on the substrate and having a mesh shape,
wherein the wire electrode includes:
a first sub wire electrode and a second sub wire electrode extending in a first direction; and
a third sub wire electrode and a fourth sub wire extending in a second direction,
wherein the third and fourth sub wire electrodes cross the first and second sub wire electrodes in a mesh shape,
wherein the first sub wire electrode is spaced apart from the second sub wire electrode,
wherein the third sub wire electrode is spaced apart from the fourth sub wire electrode,
wherein a first spaced distance (D1) between the third and fourth sub wire electrodes is different from a second spaced distance (D2) between the first and second sub wire electrodes, and
wherein a third spaced distance (D3) between mesh lines of the sensing electrode is different from the second spaced distance (D2) between the first and second sub wire electrode.

14. The touch window of claim 13, wherein the third and fourth sub wire electrodes extend in a direction corresponding to at least one of the mesh lines of the sensing electrode.

15. The touch window of claim 13, wherein the first spaced distance (D1) is greater than the second spaced distance (D2).

16. The touch window of claim 13, wherein the third spaced distance (D3) is greater than a second spaced distance (D2).

17. The touch window of claim 13, wherein a line width of at least one of the third and fourth sub wire electrodes corresponds to a line width of at least one of the mesh lines of the sensing electrode.

* * * * *